United States Patent

Shimura

[15] 3,639,758
[45] Feb. 1, 1972

[54] X-RAY STRESS MEASURING APPARATUS

[72] Inventor: Yoshihiro Shimura, Tokyo, Japan
[73] Assignee: Rigaku Denki Company Limited, Tokyo, Japan
[22] Filed: Feb. 3, 1970
[21] Appl. No.: 8,300

[30] Foreign Application Priority Data
Mar. 7, 1969 Japan.................................44/16875

[52] U.S. Cl..............................................250/51.5, 313/56
[51] Int. Cl........................................................G01n 23/20
[58] Field of Search......................250/49.5 PE, 51.5; 313/56

[56] References Cited

UNITED STATES PATENTS

| | | | |
|---|---|---|---|
| 2,760,055 | 8/1956 | Laster, Jr.............................. | 313/56 X |
| 2,948,822 | 8/1960 | Paroselli................................. | 313/56 |
| 3,030,507 | 4/1962 | Khol...................................... | 250/51.5 |
| 3,402,291 | 9/1968 | Weinman.............................. | 250/51.5 |

Primary Examiner—William F. Lindquist
Attorney—Alfred W. Breiner

[57] ABSTRACT

The present invention provides an X-ray stress measuring apparatus wherein two X-ray detectors are simultaneously movable on a circular arc about the incident point of X-rays from an X-ray tube in a plane including said incident point and two targets.

6 Claims, 4 Drawing Figures

PATENTED FEB 1 1972 3,639,758
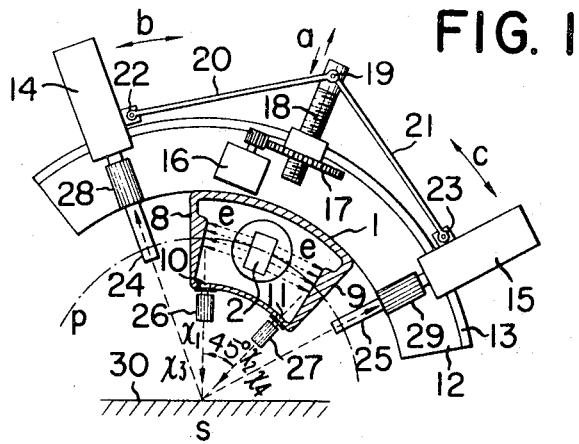
FIG. 1
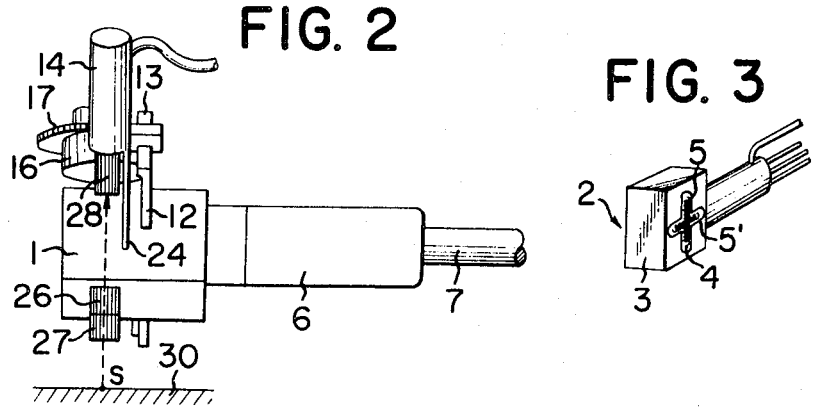
FIG. 2
FIG. 3
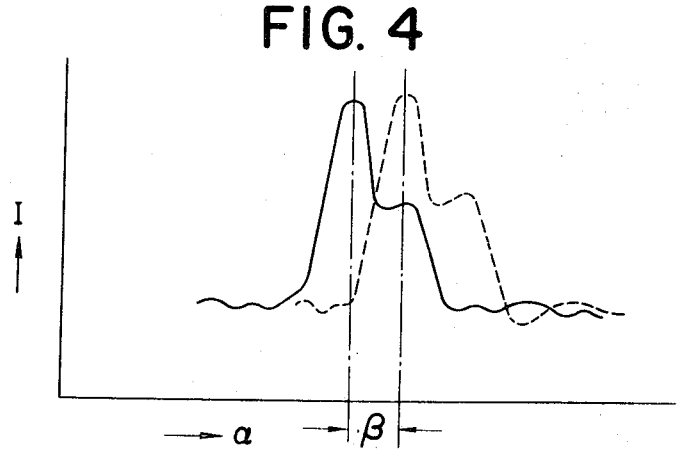
FIG. 4

X-RAY STRESS MEASURING APPARATUS

The present invention relates to an X-ray stress measuring apparatus.

Deformation occurs, for example, in welds of metal. To measure the internal stress of this deformation nondestructively, X-ray diffraction can be used. Namely, the variation of spacings between crystal lattice planes due to internal stress is measured. The internal stress may be found from the difference between diffraction angles of X-rays diffracted on both sides of the incident X-rays by applying X-rays to a specimen at a proper angle, generally at 45°. Alternatively, X-rays are applied to a specimen at 90° and at another proper angle, generally 45°, and the difference between diffraction angles of both incident X-ray beams is measured. The apparatus according to the present invention belongs to the latter method. In prior arts of apparatuses, in general, an X-ray tube having a single target was used and the diffraction angles of X-rays incident at 90° and at 45° are measured one after another, so that the measuring efficiency was low. Further, the target was arranged on the axis of the X-ray tube and X-rays emitted from the target were projected onto the specimen surface. The detector for diffracted X-rays was arranged sideways of the tube. When the tube is to be brought close to the specimen to increase the intensity of the incident X-rays, deterioration of the measuring accuracy results, for the angle between the incident and diffracted X-rays cannot be reduced.

The object of the present invention is to provide an X-ray stress measuring apparatus having a high-measuring accuracy, wherein an X-ray tube is arranged close to the surface of a specimen to increase the intensity of the incident X-rays.

In the accompanying drawing:

FIG. 1 is a cross-sectional front view of an embodiment of the apparatus according to the present invention;

FIG. 2 is a side elevation of the apparatus in FIG. 1;

FIG. 3 is a perspective view of a hot cathode of the X-ray tube used in the apparatus in FIG. 1; and FIG. 4 is an example of curves measured by the apparatus in FIG. 1.

FIGS. 1-3 show an embodiment of the present invention. The head of an X-ray tube 1 is formed as sector tube, in the center of which a hot cathode 2 is arranged. The cathode 2 comprises a rectangular box-shaped control grid 3 and two hot filaments 4 crossed in said control grid, as shown in FIG. 3. Crossed slits 5, 5' are provided on both sides of the grid 3. Either of both filaments can be selectively heated. The filaments and the grid are connected to a high-voltage cable 7 outside the tube through a glass tube 6 extending axially of the tubular head. Arranged on the inside surfaces of gastight tube walls forming both sides of the sector-shaped tubular head are targets 8 and 9 of desired metal in such a way that they are opposed to the slits 5, 5'. And provided in the inner arcuate gastight wall of the sector-shaped head are windows for X-rays 10 and 11 opposed to the targets 8 and 9, respectively. The outer arcuate gastight wall of the head of the X-ray tube 1 carries a baseplate 12 for mounting X-ray detectors, on the outer periphery of which a circular arc-shaped guideway 13 is formed. Two X-ray detectors 14 and 15 are slidably mounted on the guideway 13. Further, fixed on the baseplate 12 is a small electric motor 16, to which a toothed wheel 17 is connected. The hub of the toothed wheel 17 is screwed on a threaded rod 18. Links 20 and 21 pivotally mounted on the end of the threaded rod 18 by means of a pin at 19 are connected at the other ends to the X-ray detectors 14 and 15 by means of pins 22 and 23.

The detector is further equipped with a slit mounting arm 24; 25 extending forwardly, and soller slits 26; 27 and 28; 29 are arranged in front of the window 10; 11 of the tube and in front of the X-ray detector 14; 15. When one of the crossed filaments is energized and heated and electron beams are projected onto the targets 8 and 9 through the slit 5 extending right angles to a tubular shaft of the grid 3, as shown by dotted lines e in FIG. 1, X-rays generated from the targets form parallel X-rays through the soller slits 26 and 27. The X-ray tube 1 is so constructed that these X-ray beams x1 and x2 intersect with each other at an angle of 45°. The targets 8 and 9 are at equal distances from the intersection s and the guideway 13 is a circular arc about the point s. The soller slits 28 and 29 are so mounted that the parallel X-rays from the point s fall upon the detectors 14 and 15. The links 20 and 21 are equal in length and the threaded rod 18 is arranged in the direction of the bisector of the angle formed by the links 20 and 21. Hence, when the motor 16 rotates, the threaded rod 18 moves in the direction of arrow a and the X-ray detectors 14 and 15 move in the direction of arrows b and c symmetrically with regard to the X-ray tube.

Such an apparatus is arranged above a specimen of iron, steel or any other material in such a way that the intersection s of the X-ray beams x1 and x2 projected from the soller slits 26 and 27 lies on the surface of the specimen and that the X-ray beam x1 falls upon the specimen surface perpendicularly. Therefore, the X-ray beam x2 falls upon the specimen surface at an angle of 45°. In this condition, the motor 16 is started to move the X-ray detectors 14 and 15 symmetrically, for example, toward the X-ray tube 1. At the same time, the outputs of the detectors 14 and 15 are applied to an automatic register for recording the output I as a function of the displacement angle $\alpha$ of the detector. The register draws two curves as shown by a full and a broken line in FIG. 4. From the difference $\beta$ between angles at which the two curves take their maximum, the internal stress of the specimen 30 in the direction of the intersection of the specimen surface with a plane including the X-ray beams x1 and x2 can be estimated.

More particularly, diffracted X-ray beams x3 and x4 are generated from the X-ray beams x1 and x2 incident upon the specimen surface 30 at 90° and 45°. The X-ray detectors 14 and 15 detect the diffracted X-ray beams x3 and x4, respectively, so that the angles corresponding to the maximums of the full and broken lines indicate the diffraction angles. It is well known that the internal stress of a specimen can be calculated from the difference $\beta$ of these diffraction angles. In this case, the Bragg's formula applies:

$$2d \sin \theta = n\lambda,$$

wherein $\theta$ = diffraction angle of X-rays, $\lambda$ = wavelength of X-rays, $d$ = spacing between crystal lattice planes of a specimen and $n$ = a positive integral number. Assuming that the diffraction angle $\theta$ varies by $\Delta\theta$ with variation of the spacing between lattice planes by $\Delta d$ caused by the internal stress, the following equation is obtained:

$$\Delta\theta = -(\Delta d/n \cdot \tan \theta).$$

In order to increase the variation $\Delta\theta$ to enhance the detecting accuracy, it is, therefore, necessary to make the diffraction angle as near 90° as possible. Namely, the accuracy can be improved by lessening the angle between X-ray beams x1 and x3 or x2 and x4. Since, in the apparatus according to the invention, the hot cathode 2 is arranged in the center of the tube and the targets 8 and 9 are provided on the inside of the sidewalls, the above-mentioned angle can be made quite small, thus permitting highly accurate measuring. On the contrary, with a constant diffraction angle $\theta$, the X-ray tube 1 may be brought close to the specimen surface, so that intensive X-rays are projected to facilitate the detection of diffracted X-rays. In this case, the measuring accuracy can be improved by spacing the X-ray detectors enough from the point s.

Further, the apparatus according to the present invention can apply simultaneously two X-ray beams to a specimen at 90° and 45° from an X-ray tube and move simultaneously two X-ray detectors, thereby to detect simultaneously the diffracted X-rays of the respective incident X-ray beams. Hence, the measuring operation can be performed efficiently and rapidly. In addition, errors due to deviation of set positions, as is the case with the successive measuring method, can be prevented. The X-ray beam x2 incident obliquely upon the specimen generates diffracted rays on both sides thereof, i.e., thereover and thereunder beam. The apparatus according to the present invention detects only an X-ray beam x4 diffracted under the incident X-ray beam. Crystal lattice planes participating in this diffraction are right angled to the bisector of the angles between $x_2$ and $x_4$ and form a larger angle against the specimen surface than those which participate in the upside diffraction, so that the spacing between them greatly varies with a stress parallel to the specimen surface. Therefore, the measurement is possible with a higher accuracy than the upside diffracted rays are detected.

The above description applies in case of measurement with parallel X-rays. Measurement by concentration method is possible by heating the hot filament arranged in the axial direction of the X-ray tube 1 to project electron beams through the slit 5' of the grid 3 to the targets 8 and 9 and to form a focal line of X-rays perpendicular to the drawing plane of FIG. 1. In this case, the soller slits 26–29 are removed and finer slits are so mounted on the arms 24 and 25 that they are on a circular arc, shown by a dot-and-dash line $p$, passing through the position of said focal line about the point $s$. It is also possible to measure simultaneously the internal stresses in two perpendicularly intersecting directions, if a cathode is arranged in the center of a tube and three targets are provided on the inside surface of the tube wall.

What is claimed is:

1. An X-ray stress measuring apparatus comprising a hot cathode arranged in the center of an X-ray tube, at least two X-ray generating targets opposed to said cathode and arranged on the inside surfaces of said tube, said targets applying X-rays to the surface of a specimen on the same position at 90° and at any other desired angle; two X-ray detectors arranged outside said targets, means for moving each of said X-ray detectors symmetrically in relation to the X-ray tube, a register for recording the relationship between the displacement angle of each detector and the output thereof, whereby the internal stress of a specimen in the direction of the intersection of the specimen surface with a plane including the two X-ray beams can be estimated from the difference between the displacement angles at which peak outputs are obtained from the two detectors.

2. The apparatus of claim 1 wherein said X-ray tube has a sector-shaped tubular head and said targets are arranged on the inside surfaces of the sector walls of said tubular head.

3. The apparatus of claim 2 wherein said tubular head includes a baseplate for mounting said detectors.

4. The apparatus of claim 3 wherein the outer periphery of the baseplate forms a circular arc-shaped guideway and said detectors are slidably mounted thereon.

5. The apparatus of claim 1 wherein said cathode comprises a rectangular box-shaped control grid and two hot filaments in said grid.

6. The apparatus of claim 5 wherein said filaments are selectively heated.

* * * * *